United States Patent [19]

Alpers et al.

[11] Patent Number: 5,160,934

[45] Date of Patent: Nov. 3, 1992

[54] CROSS-SWITCHED MICRAD SEEKER

[75] Inventors: Frederick C. Alpers; Mervyn C. Hoover, both of Ridgecrest, Calif.

[73] Assignee: The United States of America as represented by the Secretary of the Navy, Washington, D.C.

[21] Appl. No.: 649,501

[22] Filed: Aug. 27, 1984

[51] Int. Cl.⁵ .............................. G01S 3/02; G01S 5/04
[52] U.S. Cl. .................................... 342/351; 342/437; 342/444
[58] Field of Search ................... 343/351, 16 LS, 427, 343/437, 444; 244/3.16, 3.15, 3.17, 3.19; 250/342

[56] References Cited

U.S. PATENT DOCUMENTS

| | | | |
|---|---|---|---|
| 3,325,644 | 6/1967 | Frye et al. | 250/83.3 |
| 3,466,654 | 9/1969 | Abronson | 343/100 |
| 3,599,211 | 8/1971 | Mardon | 343/100 |
| 3,836,972 | 9/1974 | Conway et al. | 343/16 LS |
| 3,883,876 | 5/1976 | Roeder et al. | 343/117 R |
| 3,897,917 | 8/1975 | Johnson | 244/3.16 |

OTHER PUBLICATIONS

Swanson et al, The Tiros-N Microwave Sounder Unit, Int'l. Microwave Symposium Digest, Wash. D.C., May 28-30, 1980, pp. 123-125.

Primary Examiner—Gregory C. Issing
Attorney, Agent, or Firm—Melvin J. Sliwka; John L. Forrest, Jr.

[57] ABSTRACT

A MICrowave RADiometric (MICRAD) guidance system is disclosed which utilizes an antenna having four beams, designated right, left, up and down. Information from the four beams is monitored essentially 100% of the time by passing through appropriate ferrite cross-switching means to four separate receivers. Information from two of the receivers passes through a first multiplexer and feedback gain balancer to provide a target azimuth output, and information from the remaining two receivers passes through a second multiplexer and feedback gain balancer to provide a target elevation output. A local oscillator heterodynes each of the four receivers in common, and a switch driver couples each of the multiplexers to the ferrite cross-switching means and gain balancers for appropriate selection.

13 Claims, 5 Drawing Sheets

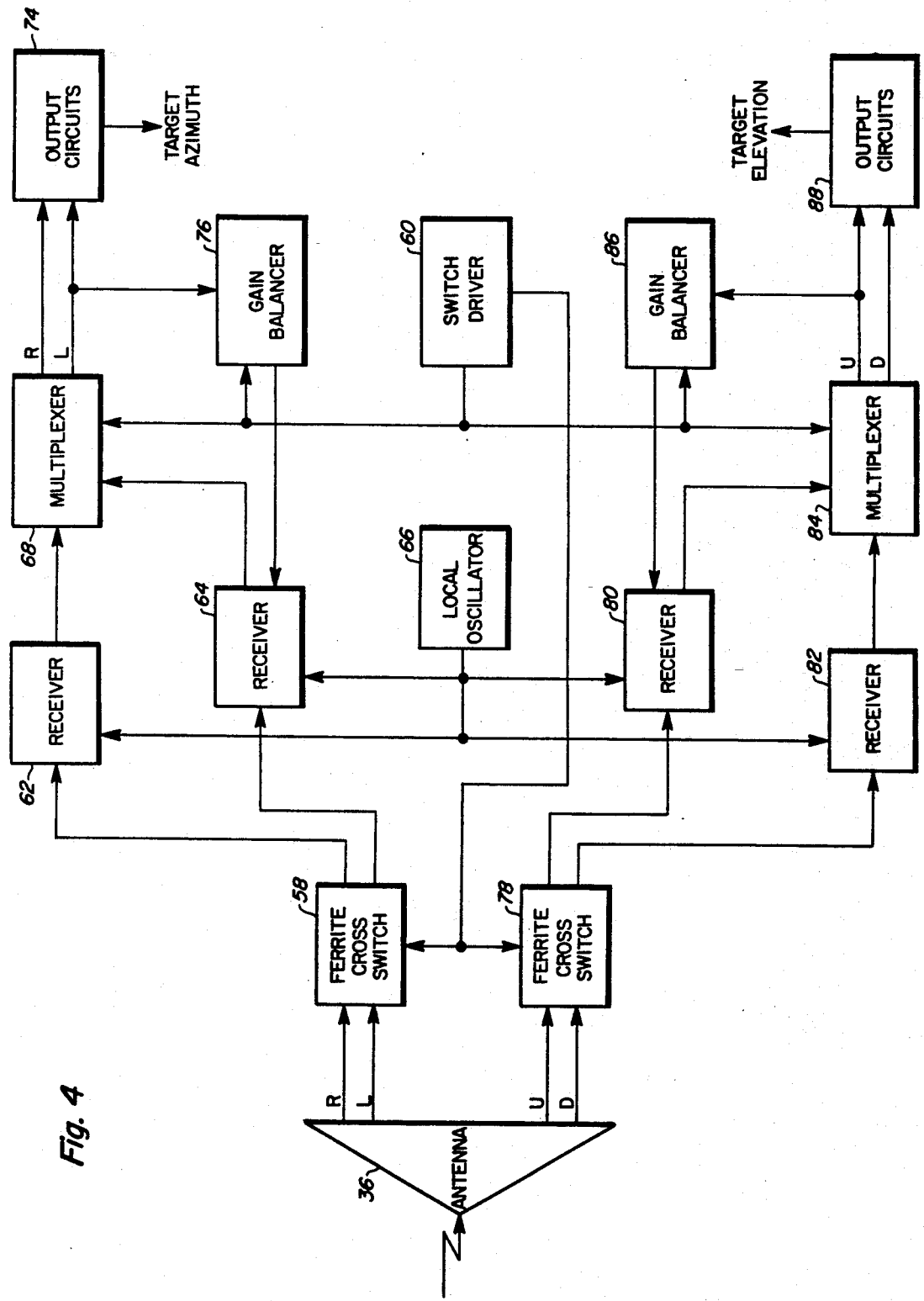

CROSS-SWITCHED MICRAD SEEKER

BACKGROUND OF THE INVENTION

1. Field of the Invention

The invention relates generally to a passive microwave, short range missile guidance and target seeker system. More specifically, the invention is an improved MICrowave RADiometry (MICRAD) guidance system target seeker that supplies constant azimuth and elevation guidance to a missile seeking a surface target on land or sea by means of an interrelationship of emissions received in a passive multiple beam antenna.

2. Description of the Prior Art

For some time, efforts have been made to develop a off tactical missile (STM) involving a Mach 3 air-to-surface missile utilizing a combination of inertial and microwave radiometry guidance systems. A MICRAD seeker was developed from this effort to provide terminal guidance in azimuth and elevation of an STM type vehicle. In certain situations, early designs were adequate for terminal guidance, which applied to the last few miles of a one hundred mile flight, but in other situations, particularly ones involving sea targets where the exact location of the target was unknown, the seeker detection range was shorter than desired and/or the ultimate search for the target prior to acquisition could not be done as rapidly as desired due to seeker integration time limitations. A need to alleviate these shortcomings led to the Cross-Switched MICRAD Seeker described in this disclosure.

Unlike other types of microwave seekers, a MICRAD seeker, in general, utilizes only thermal black body radiation and/or reflected radiation from the sky as the signals from which it derives guidance information. Targets, which are primarily man-made objects, generally serve as good reflectors of a cold sky and thus contrast rather effectively with a natural (warm) background.

The signals received and utilized by a MICRAD seeker are thermal noise. A MICRAD seeker is able to distinguish noise amplitude from one source to another by differentiating between apparent temperatures, a combination of black body and reflected sky effect, of the various sources viewed. Separating signals from one source from those of another source requires the use of an antenna with a narrow field of view (FOV) obtained by using a large antenna and/or an extra high frequency energy medium. Because missile size constraints allow use of only a small antenna, the narrow FOV, e.g. one or two degrees, is obtained by operating a MICRAD seeker in the millimeter wave region of the electromagnetic spectrum, e.g. $10^2$ GHZ.

A seeker is a sensor which has the additional capability of providing directional information for homing guidance. A MICRAD seeker is a seeker that utilizes a radiometer type sensor.

Prior art MICRAD seekers relate primarily to a Dicke type radiometer. A principal feature of the Dicke radiometer is that the input to a receiver is switched back and forth between a sensor antenna and a millimeter wave temperature reference. The reference has a known absolute temperature, or one that can easily be measured, and is shielded from other sources of radiation so that it emits black body signals at a power level that can be calculated by the use of Boltzman's Constant $(1.380 \times 10^{-23}$ joules/ °K). The load thus becomes a source of reference information to which information from the antenna can be compared as a consequence of the switching action. The aggregate temperature of objects within the antenna FOV can thereby be determined regardless of small changes or drifts in the gain of the receiver.

An essential component of the Dicke radiometer, the millimeter wave Dicke switch, is essentially a single pole, double throw (SPDT) switch that is controlled electronically by a switch driver circuit, which may be regarded as a square wave generator. The switch driver circuit also supplies a switching reference signal to a synchronous detector that follows the receiver. The detector then supplies a bipolar output which typically is positive when the signal from the antenna is higher than the reference load signal, or negative when the antenna signal is lower than the reference load signal. Furthermore, the synchronous detector output becomes more positive or less negative, when an object that has a higher apparent temperature comes within the antenna FOV, and vice versa for a colder object.

Since black body emissions within the millimeter wave portion of the spectrum are extremely weak at normal terrestrial temperatures, the receiver used in a radiometer must have very high gain and must minimize noise signals that arise from sources back of the input. In present day radiometers these requirements are generally met by use of a superheterodyne amplifier involving a low noise local oscillator, a low noise mixer, an IF amplifier, typically centered at several hundred megahertz with a bandwidth, counting both sidebands, that may be three times the bandwidth of the IF amplifier, and a square law detector. The output of the square law detector, usually called video, is either detected noise that is modulated by Dicke switching or is any change in input signal due to scanning action of the antenna, both of which involve frequencies much below those of the IF amplifier. Various output circuits then follow the synchronous detector and control the time period for integration of the signals before a unit of output information is supplied. As will be discussed infra, the integration time $\tau$ is important because it helps determine how fast the antenna may be scanned when it is necessary to search for a target.

More recent MICRAD seekers improved on the earlier Dicke radiometer in several important areas. In recent MICRAD seekers an antenna with four beams is used; canted slightly up (U), right (R), down (D), and left (L) from the central axis of the antenna. Such an antenna could be implemented by using a simple parabolic reflector with four wave guide feeds in a diamond configuration clustered about the focal point. The feed spacing may be such that the 6 dB boundaries of all beams meet on the antenna axis. This results in a multiple beam pattern projected on the ground or the surface of the sea. Black body and reflected sky radiations from within these beams enter the respective antenna feeds and are processed by the seeker to gain the information needed for weapon guidance; i.e. if a contrasting target is present and if it lies more in one beam than the opposite one, the signals reaching the related feeds will differ and the magnitude and direction of that difference forms the basis for guidance corrections. Another improvement in recently developed seeker systems over prior Dicke radiometers lies in the switching arrangement that follows the antenna and in the use of dual parallel receiving channels, one of which is concerned with the azimuth (R-L) measurements, and the other with elevation (U-D) measurements. The operation of the two channels is identical, so only the azimuth channel will be described herein.

Signals from the R and L antenna feeds go to opposite inputs of an SPDT switch, wherein the center contact of the switch leads to the azimuth receiver. The switch is a ferrite electronic type that is typically operated from one input to the other and back to the first at a rate of several kilohertz. The receiver and synchronous detector which follow and the associated millimeter wave local oscillator and switch driver circuits are similar to their Dicke radiometer counterparts. Switching between multiple antenna feeds rather than from a singular antenna feed to a load as in the Dicke case means that instead of comparing the apparent temperature observed by the antenna to a known absolute temperature, the seeker compares what is seen in the R channel to that in the L channel as a reference and vice versa; i.e. only relative data is developed. The output of the synchronous detector may be positive if the target has a higher apparent temperature than its surroundings and lies predominantly within the FOV of antenna feed R, and will be negative if it lies mainly within the FOV of antenna feed L. However, if the target has a lower temperature, these output polarities will be reversed. The output circuits can properly interpret these results either by being preset for a cold or hot target or by measuring whether a higher or lower output occurs as the antenna is scanned from right to left across the target. This interpretation would be included in the functions of the output circuitry so that target azimuth signals supplied to the missile control system or autopilot have the proper guidance sense.

When used on an STM against land targets, the seeker is mounted on gimbals. The gimbals are controlled by an inertial system which points the seeker antenna at the expected target position when it is time for the seeker to acquire the target in the terminal homing phase. Against sea targets, the lack of precise knowledge of an enemy ship's position, plus the ship's travel between the time of setting the target data into the inertial guidance system and the missile's arrival in the ship's vicinity, will generally require that the seeker search the ocean surface with its antenna beams in order to acquire the target. Such autonomous acquisition involves using the gimbals to scan the surface in a prescribed pattern until a difference in apparent temperature between opposite beams (L-R, U-D) indicates the presence of a target, at which point the searching can be stopped and tracking commenced. If the ship is moving, the apparent radiometric wake may be a dominant factor in the detection and acquisition process.

Although these prior art MICRAD seekers were competent and sufficient for their intended purposes at the time, they possessed inherent shortcomings and limitations. A primary improvement offered by the Cross-Switched MICRAD seeker invention disclosed herein is that it uses the signals available in all four antenna beams essentially 100% of the time versus the 50% time use in previous MICRAD seekers. In effect, either data rate at the seeker output or integration time of the Cross-Switched MICRAD seeker is effectively twice that of earlier seekers. Because it is provided with the increased time utilization, the Cross-Switched MICRAD seeker allows operation against a smaller target, targets with reduced contrast from the background, or targets at increased range in comparison to previous seekers.

In addition there exists a continuing need to provide better counter-countermeasure effective techniques. Since all MICRAD seekers to date look right and left or up and down at different times, such seekers may be thrown into a guidance loop oscillation, or may be caused to break lock by an enemy swept frequency or amplitude modulated jammer. Such jammers cause a very strong signal to appear in the R channel for a short time and then in the L channel, and typically vary their sweep frequency in such manner that it is likely to come into synchronism with a seeker switching rate or an odd subharmonic thereof.

The Cross-Switched MICRAD seeker offers a substantial improvement over prior art MICRAD seekers by using a multiple of radiometric receivers which are cross-switched between opposite channels to permit essentially 100% use of incoming signals in all four antenna beams (R, L, U, D). The Cross-Switched MICRAD seeker retains the stability advantages of a Dicke type radiometer and improves the sensitivity by a factor approaching 2. Another ancillary feature of the Cross-Switched MICRAD seeker is the use of synchronous detector type circuits for gain balancing so as to avoid undesirable output modulations associated with and inherent to the switching.

SUMMARY OF THE INVENTION

The Cross-Switched MICRAD seeker is a passive radiometric receiver comprising an antenna with four lobes coupled through a pair of ferrite cross-switches to four individual receivers, one each for each lobe of the antenna. Each said receiver is further coupled to a common local oscillator. The four receivers comprise left and right receivers, for an azimuth channel, and down and up receivers, for an elevation channel. Each pair of receivers is coupled through a multiplexer to a pair of output circuits providing a target azimuth and a target elevation function A pair of gain balancers couple the multiplexer outputs to one of the receivers in both the azimuth channel and the elevation channel for normalization of the gain thereof.

OBJECTS OF THE INVENTION

It is an object of the invention to provide an improved MICRAD seeker.

A further object of the invention is to provide a MICRAD seeker utilizing an antenna with four lobes and four individual receivers in such manner that information available in the four antenna beams is monitored essentially 100% of the time.

Another object of the invention is to provide an improved MICRAD seeker that has a seeker output data rate effectively twice that of previous MICRAD seekers.

Yet another object of the invention is to provide a MICRAD seeker which allows operation against smaller targets, targets with reduced contrast from the background in which they lie, and/ or targets at increased range.

A further object of the invention is to provide a MICRAD seeker having capabilities for better counter-countermeasure effectiveness.

Yet another object of the invention is to use synchronous detector type circuits for gain balancing so as to avoid undesirable output modulations associated with switching components of the circuit.

These and other features, objects, and advantages will become more readily apparent and discerned from and understanding of the attached drawings, the following description, and accompanying claims.

BRIEF DESCRIPTION OF THE DRAWING

FIG. 4 is the 4-channel Cross-Switched MICRAD seeker.

DESCRIPTION OF THE PREFERRED EMBODIMENT

To gain further knowledge of the functioning of the MICRAD seeker in general and, in particular, to note advantages of the Cross-Switched MICRAD seeker, it is helpful to refer to a MICRAD sensor detection equation.

The minimum temperature difference that can be detected when a scene is viewed by a Dicke-type MICRAD sensor is given as:

$$\Delta T_{MIN} = \frac{CT_{SYS}}{\sqrt{B\tau}} + |T_A - T_C| \frac{\Delta G}{G} \quad (1)$$

in which $$T_{SYS} = T_A + (\alpha - 1)T_O + \alpha T_O(F_N - 1) \quad (2)$$

C = a radiometer constant that depends upon the antenna design and switching cycle chosen
B = receiver noise bandwidth in Hz
$\tau$ = radiometer output integration time in seconds
$T_{SYS}$ = overall sensor noise temperature (° K)
$T_A$ = antenna temperature (° K), which means the apparent temperature of the scene within the antenna FOV
$T_C$ = reference load temperature in ° K
$T_O$ = component temperature (typically 290° K)
$\frac{\Delta G}{G}$ = normalized system gain variation due to IF amplifier instabilities, etc.
$\alpha$ = total microwave losses ($\alpha$ is greater than 1)
$F_N$ = receiver noise figure (mixer onward) Combining equations 1 and 2 yields $$\Delta T_{MIN} = \frac{C}{\sqrt{B\tau}} [T_A + (\alpha F_N - 1)T_O] + |T_A - T_C| \frac{\Delta G}{G} \quad (3)$$

Figure 1:
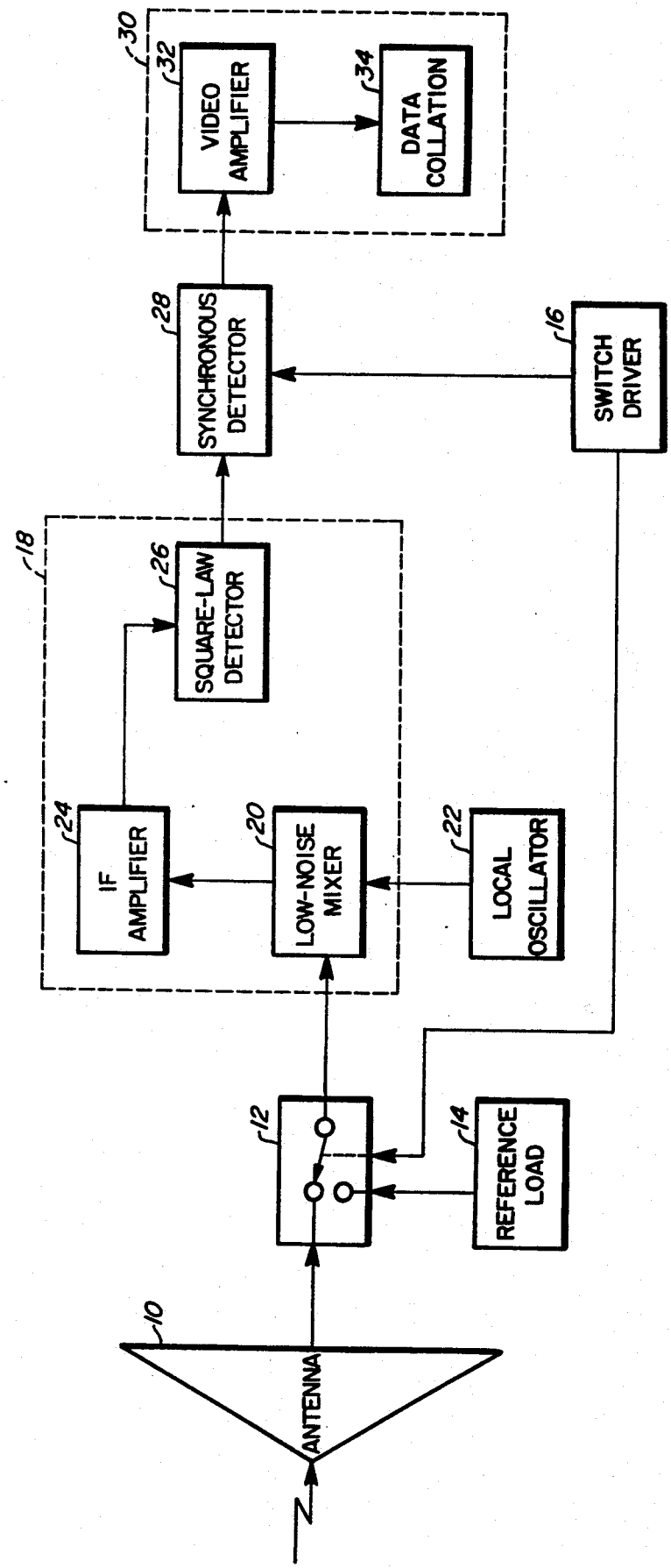
FIG. 1 is a block diagram of a Dicke type millimeter wave radiometer.
Figure 2:
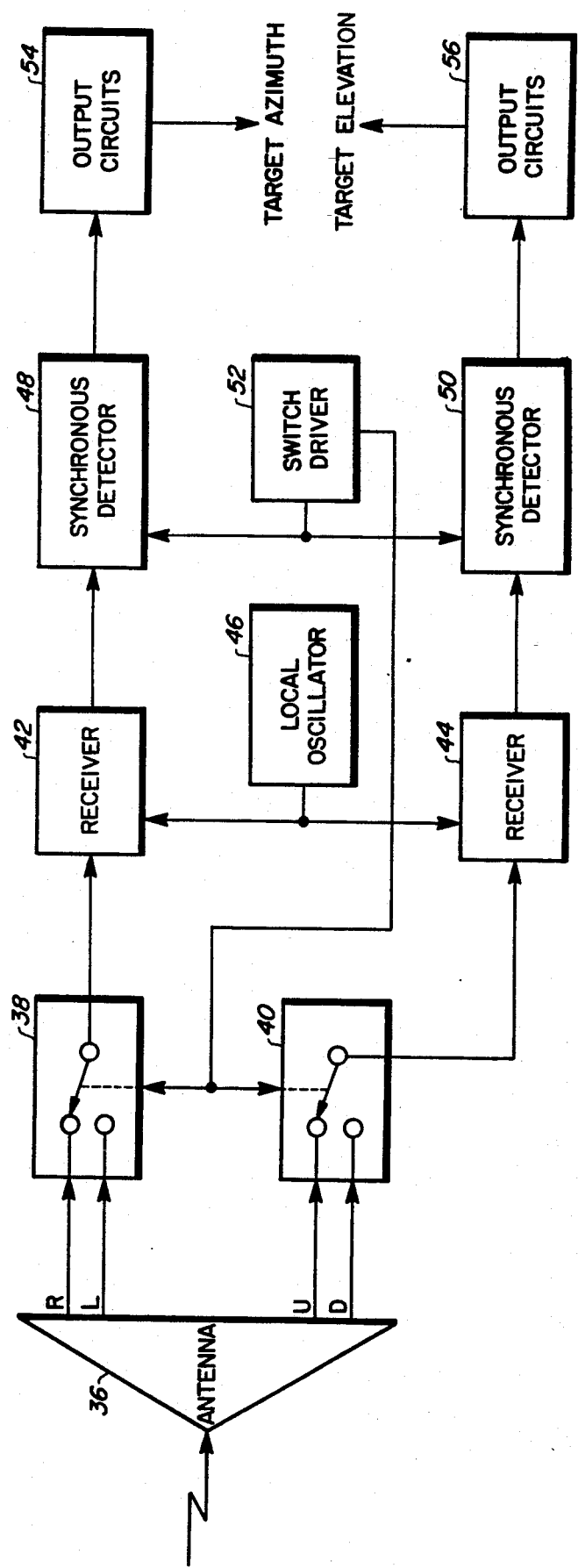
FIG. 2 is a block diagram of a 2-channel MICRAD seeker.

When equation 3 is applied to a two receiver MICRAD seeker as diagramed in FIG. 2, and it is assumed for explanatory purposes that the target is positioned so that it will be detected in the R antenna beam, $T_A$ in equation 1 may be replaced with $T_R$, the antenna temperature for beam R, while $T_C$, which is the reference load in the Dicke seeker configuration of FIG. 1, may be replaced with $T_L$, the antenna temperature for beam L. If it is now assumed that the background surfaces in the FOV of beams R and L are substantially the same as, for example, two adjacent patches of sea, and that detection is to be made when the target is distant and subtends very little of the R beam FOV, $T_R$ and $T_L$ will be nearly equal and $T_R - T_L$ will be very small. Furthermore, if care is maintained in the seeker receiver design, today's technology allows $\Delta G/G$ to be kept very small, e.g. less than 0.001. Since the final term in equation 3 is then the product of two very small numbers, it becomes negligible in relation to the remaining terms and the equation reduces essentially to $$\Delta T_{MIN} = \frac{C}{\sqrt{B\tau}} (T_A + (\alpha F_N - 1)T_O) \quad (4)$$

This shows clearly that with other parameters held constant $\Delta T_{MIN}$ will vary inversely with the square root of the integration time $\tau$. This relationship is of key importance to the subject invention.

Now consider $R_{DET}$, which is defined as the maximum range at which the desired probability of detection of a given target against a given background can be achieved. For brevity, how $R_{DET}$ varies from one probability of detection to another will not be discussed. Nevertheless, assuming uniformity of backgrounds within the FOV of opposite beams, there will be a moderate probability of detection whenever the difference in apparent temperatures between opposite antenna beams equals or exceeds $\Delta T_{MIN}$, and the probability level will mount quickly if any excess builds up. The antenna temperature $T_A$ for a beam which views background but no target will be simply $T_B$, the temperature resulting from the background black body and sky reflecting characteristics. The temperature for a beam containing the target in its FOV will be $(K_{BF})(T_T) + (1 - K_{BF})T_B$ where $T_T$ is the combined black body/scatter reflecting temperature of the target, and $K_{BF}$ is the beamfill factor which is defined as the ratio of the solid angle that is subtended by the target within the beam to the total equivalent solid angle within the beam. Hence, $R_{DET}$ will occur when $$\Delta T_{MIN} = |T_B - [K_{BF}T_T + (1 - K_{BF})T_B]| = K_{BF}|T_B - T_T| \quad (5)$$

As the missile closes range, while keeping the target within the seeker's field of scan, geometrical considerations show that $K_{BF}$ increases in inverse proportion to the square of the varying range R, i.e.

$$K_{BF} = \frac{K}{R^2} \quad (6)$$

where K is a constant that depends upon the target's cross-sectional area and the dimensions of the beam. Combining equations 4, 5, and 6 and eliminating $\Delta T_{MIN}$ at the point when $R = R_{DET}$ yields:

$$\frac{K}{R_{DET}^2} |T_B - T_T| = \frac{C}{\sqrt{B\tau}} [T_A + (\alpha F_N - 1)T_O] \quad (7)$$

or $$R_{DET} = \left( \frac{K|T_B - T_T| \sqrt{B\tau}}{C[T_A + (\alpha F_N - 1)T_O]} \right)^{\frac{1}{2}}$$

where all quantities in the right hand part of the equation except $\alpha$ are independent of R and $\alpha$ is only slightly dependent on R due to the atmospheric attenuation losses that are included. Thus equation 7 indicates that $R_{DET}$ varies with a fourth root of $\tau$, which is another relationship that is of importance to the invention.

Referring now to FIG. 1, a block diagram of a Dicke type millimeter wave radiometer is illustrated for purposes of comparison and understanding of the invention. The Dicke type millimeter wave radiometer comprises a single antenna 10 for receipt of microwave or infrared emissions in a single beam FOV. A Dicke switch 12 is caused to oscillate between signals received on antenna 10 and a reference load 14 by a switch driver 16, a concept well-known in the art as described earlier. Information from Dicke switch 12 then passes into a receiver circuit, dashed box 18, comprising a low noise mixer 20 heterodyned by a local oscillator 22. Output of low noise mixer 20 is amplified in IF amplifier 24 and then passes through a square law detector 26 which converts the amplified IF power signal to an analog modulated DC voltage output. Relevant information from square law detector 26 is coordinated through a synchronous detector 28 with Dicke switch 12 by switch driver 16. Synchronous detector 28 in effect accomplishes a sorting/processing function of signals received. Data from synchronous detector 28 then passes into an output circuit, dashed box 30, comprising a video amplifier 32 and data collation circuit 34. In data collation circuit 34 relevant information received by antenna 10 is summed on an average, and integrated over a fixed time period $\tau$ to be able to determine the differing temperature of the target within the antenna's FOV when compared to reference load 14.

From the Dicke millimeter wave radiometer of FIG. 1, a dual, two receiver channel MICRAD seeker, of FIG. 2, was developed. The block diagram of FIG. 2 describes a microwave antenna 36 having four lobes or beams of antenna 36. The four fields of view of antenna 36 are more graphically illustrated in FIG. 3 which depicts antenna lobes, R, L, U, D, surrounding a target 37. Referring again to FIG. 2, it can be observed that there is an R/L channel (azimuth) and a U/D channel (elevation) extending from antenna 36 to a first ferrite SPDT switch 38 and to a second ferrite SPDT switch 40, respectively. First switch 38 and second switch 40 pass to a first receiver 42 and a second receiver 44. First receiver 42 and second receiver 44 are jointly heterodyned by a local oscillator 46.

First and second receivers 42 and 44 are then coupled to a first synchronous detector 48 and a second synchronous detector 50, respectively. A switch driver 52 is coupled to first and second synchronous detectors 48 and 50 and drives first and second ferrite switches 38 and 40. Synchronous detector 48 is then coupled to a first output circuit 54 providing a target azimuth output, and second synchronous detector 50 is coupled to a second output circuit 56 providing a target elevation output.

Referring now to FIG. 4 a block diagram of an exemplary embodiment of the Cross-Switched MICRAD seeker is illustrated and will be described in relationship to the foregoing prior art devices of FIGS. 1 and 2. In delineating the Cross-Switched MICRAD seeker diagramed in FIG. 4, only the R-L channel will be addressed since the U-D channel functions identically.

Figure 5:
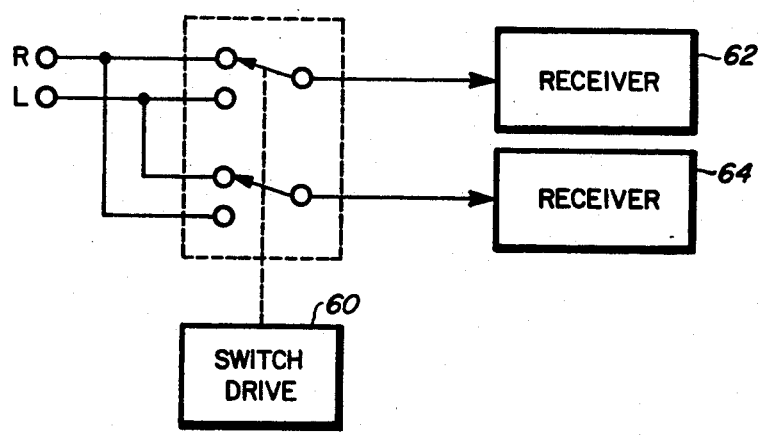
FIG. 5 is a basic cross-switching circuit utilized in the Cross-Switched MICRAD seeker.
Figure 6:
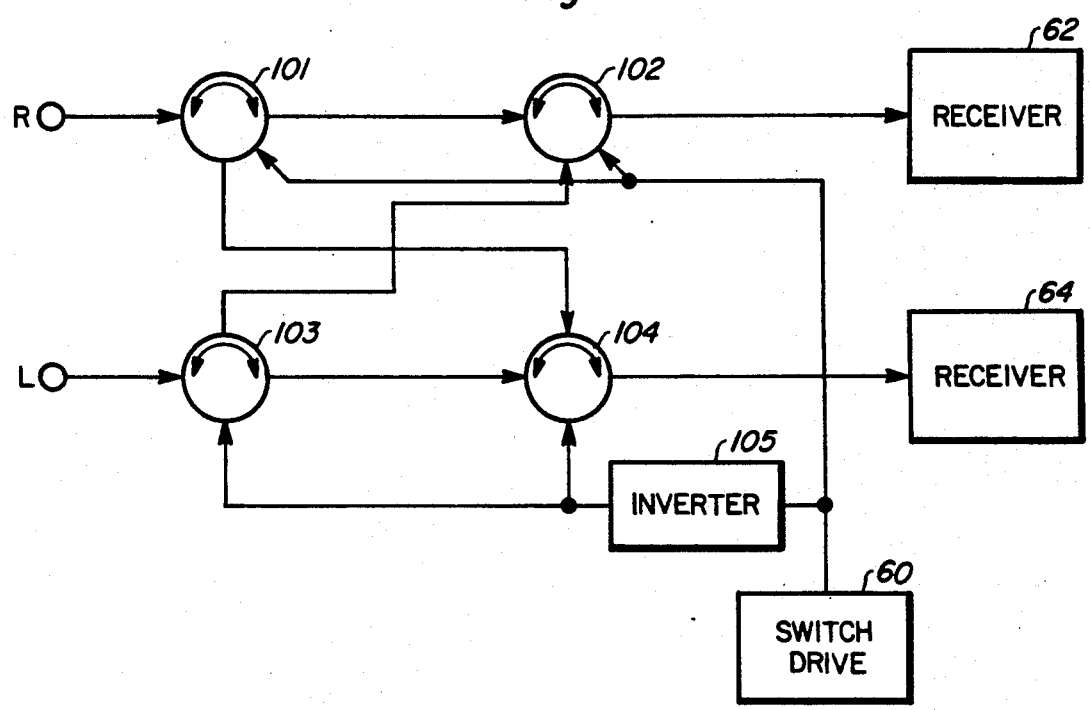
FIG. 6 is the microwave frequency equivalent of FIG. 5 using latching ferrite circulators.

An antenna 36 can be the same as used in the known seeker design of FIG. 2. Antenna feeds that form the R and L beams are connected to a first ferrite cross-switch 58. First ferrite cross-switch 58 is a high speed microwave equivalent of a double pole double throw (DPDT) mechanical switch connected as shown in FIG. 5. A conventional microwave frequency equivalent of FIG. 5 using latching ferrite circulators is illustrated in FIG. 6 and comprises four circulators 101, 102, 103, 104 interconnected as illustrated in FIG. 6 with an inverter 105. A combination of two single pole double throw (SPDT) switches used in the FIG. 2 seeker may be used as switch 58 of FIG. 4, with only slight penalties in size and in the power required to drive them. The driving power for operating switch 58 at a switching frequency of several kilohertz comes from a switch driver 60, which is much the same as switch driver 52 of FIG. 2. The outputs of cross-switch 58 go to first and second receivers 62 and 64. First and second receivers 62 and 64 each consist of components as shown in receiver 18 of FIG. 1, i.e. a low noise mixer 20, an IF amplifier 24 and a square law detector 26. The tuning of first and second receivers 62 and 64 is affected by a local oscillator 66, which can be identical to that of local oscillator 46 of FIG. 2. Local oscillator 66 of FIG. 4 supports the familiar super-heterodyne type of signal reception. As an example, local oscillator 66 might operate at 40 GHz and if first and second receivers 62 and 64 each have an IF band width that extends from 50 to 300 MHz, then radiometric noise signals with a total bandwidth, B, of 500 MHz centered about 40 GHz, i.e. both heterodyne side bands, will be received and detected by each receiver.

Figure 7:
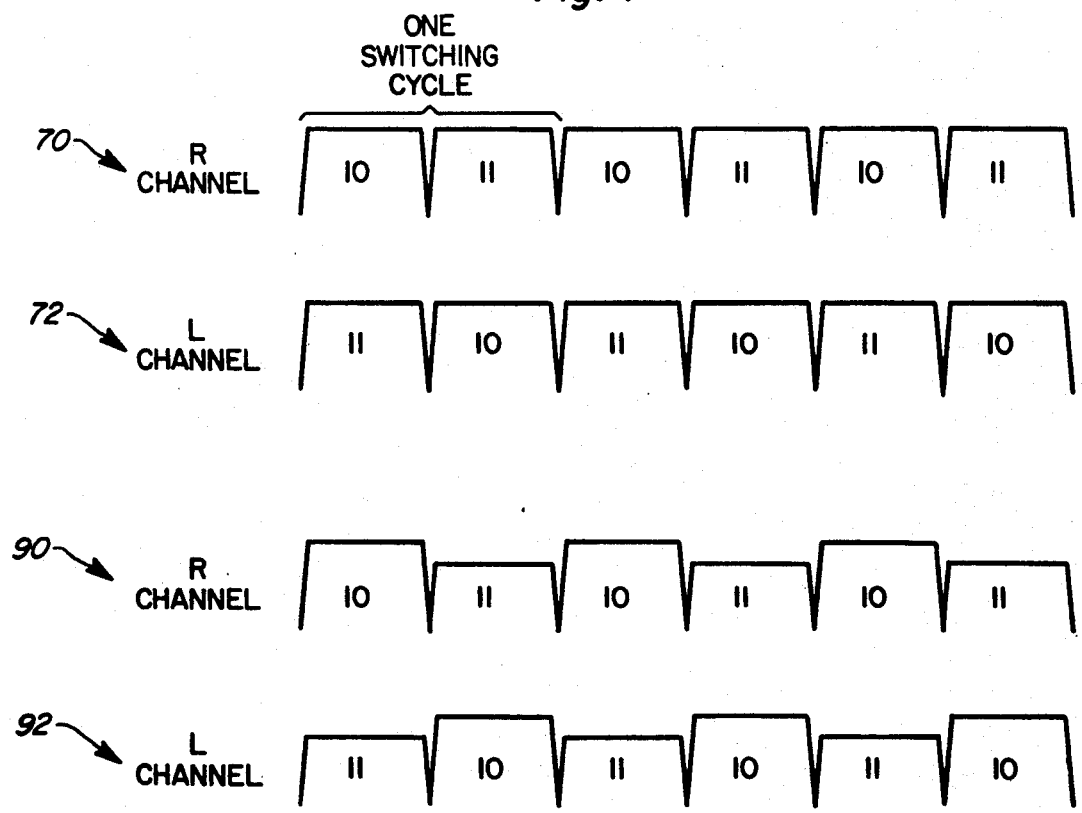
FIG. 7 is the multiplexer wave form for the Cross-Switched MICRAD seeker.

Video outputs of first and second receivers 62 and 64 are then fed to a first multiplexer 68, which performs a signal combining function under control of switch driver 60. First multiplexer 68 may be regarded as the video complement to first ferrite cross-switch 58, and it serves to bring all signals from the R beam together again in an R video channel, and likewise bringing those from the L beam into an L video channel. As shown in the top two waveforms of FIG. 7, waveforms 70 and 72, this results in the signals from the R beam of antenna 36 being processed through second receiver 64 for the first half of each switching cycle, and through first receiver 62 for the second half of each switching cycle, with the signals from the L beam being processed in the opposite sequence. Waveforms 70 and 72 of FIG. 7 illustrate outputs of multiplexers 68 and 84 when a target is on axis and receivers 62 and 64, or 80 and 82 are balanced. It is important to note that with this arrangement the signal from each beam is available essentially 100% of the time rather than stopping at an unused switch terminal 50% of the time as it does in the FIG. 2 seeker. The only reduction from 100% is the very short time lost during the switching action itself. The penalty in achieving this doubling of signal availability is a requirement for additional switching, and the need for a second complete receiver in each plane, but these are not of strong concern since all of the receiver and part of the switching can be supplied as integrated circuitry where the size and power drain are small and the cost increase nominal.

The R and L channel outputs from first multiplexer 68 both go to a first output circuit 74 yielding a target azimuth function, and one of the two outputs from first multiplexer 68 goes to a first gain balancer circuit 76. When a target is centered between the R and L beams, i.e. on axis in azimuth, the $T_B$ is the same for both beams, and when the gains of first and second receivers 62 and 64 are the same, the R and L channel outputs of first multiplexer 68 will have the same amplitude, and furthermore, the first and second half cycles of each output will be equal amplitudes as illustrated by the top two waveforms of FIG. 7, waveforms 70 and 72. However, when the gains of first and second receivers 62 and 64 are unequal, the first and second halves of each switching cycle will have different amplitudes as illustrated by the bottom two waveforms of FIG. 7, i.e. waveforms 90 and 92. Waveforms 90 and 92 of FIG. 7 illustrate outputs of multiplexer 68 when a target is on axis but receiver 62 gain is higher than that of receiver 64 or vice versa. When such an inequality exists, first gain balancer 76 acts as did each of the synchronous detectors 48 and 50 of FIG. 2, and produces a positive output when the modulation from half cycle to half cycle is in phase with the output of switch driver 60 or a negative output if out of phase. In contrast with the FIG. 2 functioning, this positive or negative output is fed back to second receiver 64 where it changes the gain slightly by familiar automatic gain control (AGC) type action and brings second receiver 64 into balance with first receiver 62. When the target is not centered between beams L and R, the L and R outputs of first multiplexer 68 will differ in amplitude and first gain balancer 76 may happen to be connected to the weaker output. Nevertheless, there would typically be ample signal available to sense variations between the two half cycle amplitudes and first gain balancer 76 will still act in the manner described to equalize receiver gains. So long as τ is very large in comparison to a switching cycle, as is generally the case, first gain balancer 76 is not really essential to the Cross-Switched MICRAD seeker operation, but it is a convenient way to remove undesirable switching frequency modulation from the signals supplied to the output circuits.

First output circuit 74 of FIG. 4 may be much the same as first output circuit 54 of the FIG. 2 seeker and will be designed to interface with the missile gimbals and/or autopilot. Generally, first output circuit 74 will include an analog to digital signal converter in each channel and likewise an integrator in each channel to establish the integration time, τ. A typical value for τ could be 50 milliseconds. With a switching frequency of 4 KHz, and R and L channel outputs would each be integrated over 200 switching cycles. Therefore, switching transients as shown in FIG. 7, which typically would be on the order of only a micro-second in duration, are of no consequence in the output measurement. As with prior seekers, the direction of guidance correction to be made, if the amplitude of the R channel output is larger than the L channel, will depend on whether $T_T$ is higher than $T_B$. First output circuit 74 must establish the sense of correction based on a preset target polarity indication or on the polarity indicated by a scan across the target position. Another function of first output circuit 74 may be to feed back an AGC voltage (not shown in FIG. 4) to both first and second receivers 62 and 64 together to keep them operating near the center of their dynamic range when the input signal levels are high, as they would be in the case of a land background. Above all, first output circuit 74 must supply the signals necessary to redirect the missile seeker gimbals and/or the nose of the missile in azimuth toward the target in a continuous manner, and thereby cause the missile to home as desired.

As indicated above, the Cross-Switched MICRAD seeker of FIG. 4 processes the U/D channels of antenna 36 in exactly the same manner as the R/L channels described above. U/D channels pass through a second ferrite cross-switch 78 into a third and a fourth receivers 80 and 82, through a second multiplexer 84 having a feedback through a second gain balancer 86 and finally leading to a second output circuit 88 providing a target elevation function output.

Figure 3:
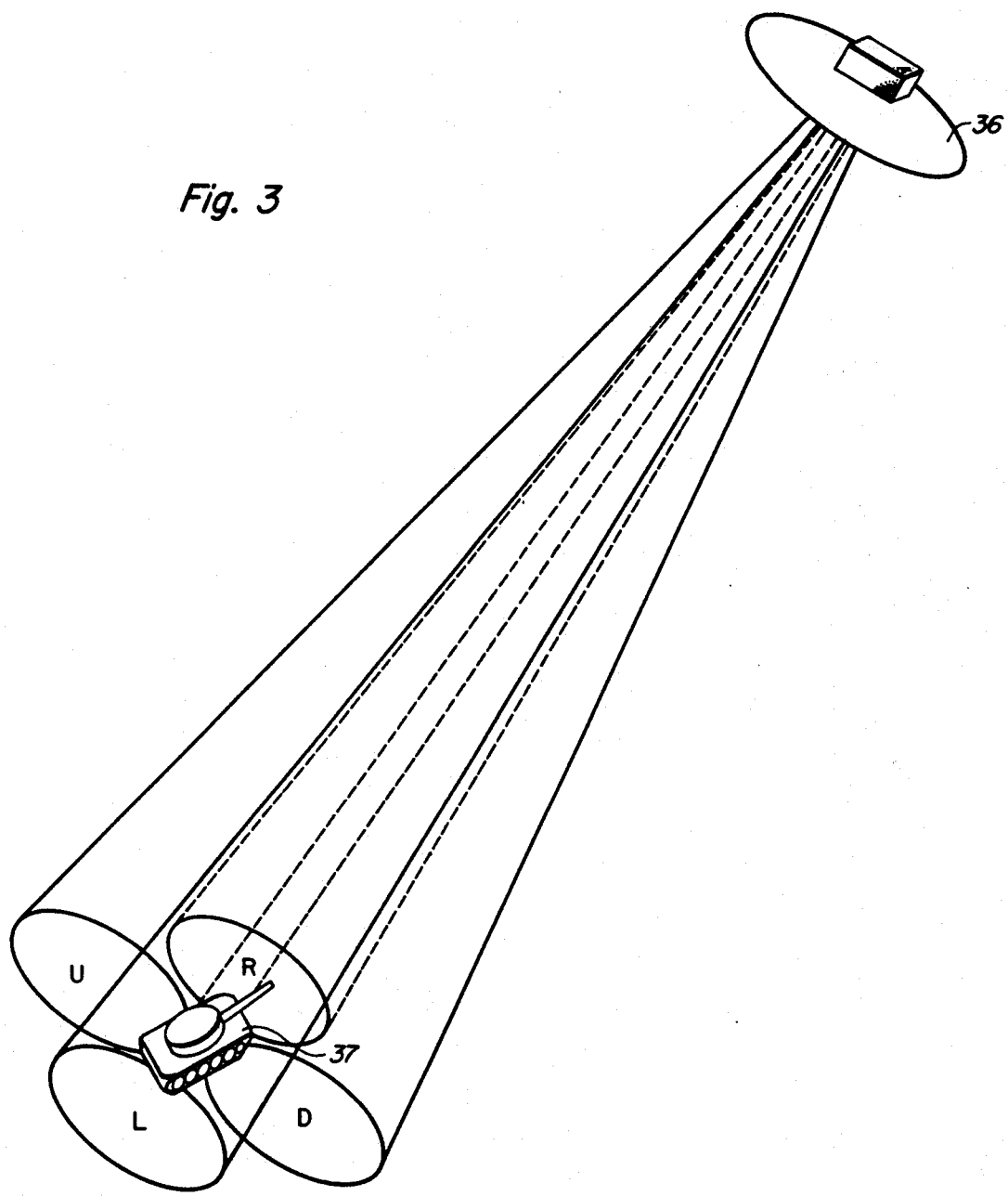
FIG. 3 is a pictoral beam arrangement utilized by a 4-channel MICRAD seeker.

An alternative to the Cross-Switched MICRAD seeker configuration of FIG. 4 could be to use the same circuitry with an antenna having four beams stacked vertically rather than in the diamond shaped pattern described in FIG. 3. If desired, additional beams and additional cross-switched receiver channels could be included. By mechanical movement of a gimbal, the stack of beams could be simultaneously scanned in azimuth, and the combined outputs over the scanning period would constitute a radiometric image of the scene that was scanned. This could be correlated against a sequence of stored images of a designated target area and used for a correlation type homing. Alternatively, the vertically stacked beams could be used to provide a rapid search for the target over a larger area, and after target acquisition, the receivers could be switched to other antenna feeds that provide a diamond shaped beam arrangement for homing.

A second alternative is to apply the Cross-Switched MICRAD receiver circuitry of FIG. 4 to a missile or aircraft position fixing function. In this function a downward looking multi beam sensor could develop a radiometric image of terrain below as the missile or aircraft advances. The image received could then be matched against a prestored image of that area for position fixing purposes. An existing MICRAD position fixer design uses four beam each with an associated non-switched receiver, to provide the on-the-spot image as the missile advances, and digital output circuitry then attempts to adjust the video outputs to the proper average levels. The cross-switching technique might accomplish this latter function more precisely and lead to somewhat better cross track position fixing accuracy.

While the invention has been described in its preferred embodiments, it is to be understood that the words which have been used are words of description rather than of limitation and that changes within the purview of the appended claims may be made without departure from the true scope and spirit of the invention in its broader aspects.

What is claimed is:

1. A Cross-Switched MICRAD seeker, comprising:
   a microwave antenna having four receiving channels configured as a right (R) channel, a left (L) channel, and up (U) channel, and a down (D) channel;
   a first ferrite cross-switch coupled to said R channel and said L channel;
   a second ferrite cross-switch coupled to said U channel and said D channel;
   a first receiver coupled through said first ferrite cross-switch to said R channel and said L channel;
   a second receiver coupled through said first ferrite cross-switch to said R channel and said L channel;
   a third receiver coupled through said second ferrite cross-switch to said U channel and said D channel;
   a fourth receiver coupled through said second ferrite cross-switch to said U channel and said D channel;
   a local oscillator coupled to each of said first, second, third, and fourth receivers;

a first multiplexer coupling said first receiver to said second receiver;

a second multiplexer coupling said third receiver to said fourth receiver;

a first gain balancer coupling said first multiplexer to said second receiver;

a second gain balancer coupling said second multiplexer to said third receiver;

a switch driver coupled to said first and second cross-switches, and coupled to said first and second multiplexers, and coupled to said first and second gain balancers;

a target azimuth output circuit coupled to said first multiplexer; and a target elevation output circuit coupled to said second multiplexer.

2. An improved MICRAD seeker of the type in which an antenna having four feeds/channels, right (R), left (L), up (U), and down (D), utilizes a first Single Pole Double Throw (SPDT) ferrite switch to couple said R and L channels to a first receiver leading to a first synchronous detector and ultimately to a target azimuth output, alternating 50% of first SPDT switch time on said R channel and 50% of said first SPDT switch time on said L channel, and a second SPDT ferrite switch to couple said U and D channels to a second receiver leading to a second synchronous detector and ultimately to a target elevation output, alternating 50% of said second SPDT switch time on said U channel and 50% of said second SPDT switch time on said D channel, wherein the improvement comprises:

means for monitoring said R channel 100% of the time and monitoring said L channel 100% of the time;

means for monitoring said U channel 100% of the time and monitoring said D channel 100% of the time;

a first receiver coupled to said R and L monitoring means for alternate R and L receipt of said R channel 50% of the monitoring time and said L channel 50% of the monitoring time;

a second receiver coupled to said R and L monitoring means for alternate L and R receipt of said L channel 50% of the monitoring time and said R channel 50% of the monitoring time;

means coupled to said first and second receivers for combining the R channel output of said first receiver with the R channel output of said second receiver to obtain a 100% R channel output, and combining the L channel output of said first receiver with the L channel output of said second receiver to obtain a 100% L channel output wherein the combination of said 100% R channel with said 100% L channel yields a target azimuth output;

a third receiver coupled to said U and D monitoring means for alternate U and D receipt of said U channel 50% of the monitoring time and said D channel 50% of the monitoring time;

a fourth receiver coupled to said U and D monitoring means for alternate D and U receipt of said D channel 50% of the monitoring time and said U channel 50% of the monitoring time; and means coupled to said third and fourth receivers for combining the U channel output of said third receiver with the U channel output of said fourth receiver to obtain a 100% U channel output, and combining the D channel output of said third receiver with the D channel output of said fourth receiver to obtain a 100% D channel output, wherein the combination of said 100% U channel with said 100% D channel yields a target elevation output.

3. An improved MICRAD seeker according to claim 2, wherein said R and L monitoring means is a DPDT ferrite cross-switch/transfer switch.

4. An improved MICRAD seeker according to claim 2, wherein said U and D monitoring means is a DPDT ferrite cross-switch/transfer switch.

5. An improved MICRAD seeker according to claim 2, wherein said R and L channel combining means is a multiplexer.

6. An improved MICRAD seeker according to claim 2, wherein said U and D channel combining means is a multiplexer.

7. A Cross-Switched MICRAD seeker, comprising:

an antenna having four feeds designated as right (R), left (L), up (U), and down (D);

means coupled to said R and L feeds for cross connecting said R and L feeds;

means coupled to said U and D feeds for cross connecting said U and D feeds;

a first receiver coupled to said R and L cross connecting means for receiving alternate R and L outputs from said R and L cross connecting means;

a second receiver coupled to said R and L cross connecting means for receiving alternate L and R outputs from said R and L cross connecting means;

a third receiver coupled to said U and D cross connecting means for receiving alternate U and D outputs from said U and D cross connecting means;

a fourth receiver coupled to said U and D cross connecting means for receiving alternate D and U outputs from said U and D cross connecting means;

a local oscillator coupled to each of said first, second, third and fourth receivers;

means coupled to said first and second receivers for combining the R outputs of said first receiver with the R outputs of said second receiver, and for combining the L outputs of said first receiver with the L outputs of said second receiver;

means coupled to said third and fourth receivers for combining the U outputs of said third receiver with the U outputs of said fourth receiver, and for combining the D outputs of said third receiver with the D outputs of said fourth receiver;

a first gain balancer coupling said R and L combining means to said second receiver for normalizing the gains therebetween;

a second gain balancer coupling said U and D combining means to said third receiver for normalizing the gains therebetween;

means coupled to said first and second gains balancers, said R and L and U and D combining means, and said R and L and U and D cross connecting means for driving each said first and second gain balancers, said R and L and U and D combining means, and said R and L and U and D cross connecting means at a specific rate;

a first output circuit coupled to said R and L combining means for providing a target azimuth function; and a second output circuit coupled to said U and D combining means for providing a target elevation function.

8. A Cross-Switched MICRAD seeker according to claim 7 wherein said R and L cross connecting means is a first ferrite cross-switch/transfer switch which sequentially alternates R and L outputs to said first receiver, while at the same time alternating L and R outputs to said second receiver.

9. A Cross-Switched MICRAD seeker according to claim 7 wherein said U and D cross connecting means is a second ferrite cross-switch/transfer switch which sequentially alternates U and D outputs to said third receiver while at the same time alternating D and U outputs to said fourth receiver.

10. A Cross-Switched MICRAD seeker according to claim 7, wherein said R and L combining means is a first multiplexer.

11. A Cross-Switched MICRAD seeker according to claim 7, wherein said U and D combining means is a second multiplexer.

12. A Cross-Switched MICRAD seeker, comprising:
a microwave antenna having 4 receiving channels configured as a right channel, a left channel, an up channel, and a down channel;
a first cross-switch coupling said right channel to said left channel;
a second cross-switch coupling said up channel to said down channel;
a first receiver coupled through said first cross-switch to said left and right channels;
a second receiver coupled through said first cross-switch to said right and left channels;
a third receiver coupled through said second cross-switch to said up and down channels;
a fourth receiver coupled through said second cross-switch to said down and up channels;
a local oscillator coupled to each of said first, second, third and fourth receivers;
a first multiplexer coupling said first receiver to said second receiver;
a second multiplexer coupling said third receiver to said fourth receiver;
a first gain balancer coupling said first multiplexer to said second receiver;
a second gain balancer coupling said second multiplexer to said third receiver;
a switch driver circuit coupled to said first cross-switch and said second cross-switch, and coupled to said first multiplexer and said second multiplexer, and coupled to said first gain balancer and said second gain balancer;
a target azimuth output circuit coupled to said first multiplexer; and
a target elevation output circuit coupled to said second multiplexer.

13. A MICRAD method for resolving a target elevation and azimuth by monitoring four sources of information 100% of the time, comprising
receiving MICRAD information through four feeds, right, left, up, and down (R, L, U and D), of a single antenna;
alternating said R and L feeds to yield an alternated R/L output and an alternated L/R output, and alternating said U and D feeds to yield an alternated U/D output and an alternated D/U output
multiplexing said alternated R/L and said alternated L/R outputs to yield a 100% R output and a 100% L output and multiplexing said alternated U/D and said alternated D/U outputs to yield a 100% U output and a 100% D output;
normalizing by gain balancing methods said 100% L output by adjusting gain of said L/R alternating process, and normalizing by gain balancing methods said 100% U output by adjusting gain of said U/D alternating process; and
monitoring said normalized 100% R output and said normalized 100% L output to yield a target azimuth, and monitoring said normalized 100% U output and said normalized 100% D output to yield a target elevation.

* * * * *